US005352347A

United States Patent [19]

Reichert

[11] Patent Number: 5,352,347

[45] Date of Patent: Oct. 4, 1994

[54] ELECTROSTATIC FILTER FOR NON-CONDUCTIVE LIQUIDS

[75] Inventor: Ralph Reichert, Belmont, Calif.

[73] Assignee: Adfiltech Corporation, Alexandria, Va.

[21] Appl. No.: 985,817

[22] Filed: Dec. 4, 1992

[51] Int. Cl.[5] ......................... B01D 35/06; B03C 5/02

[52] U.S. Cl. ..................................... 204/302; 204/186; 210/243

[58] Field of Search ............... 204/302, 304, 305, 306, 204/307, 308, 186, 188; 210/232, 243, 748

[56] References Cited

U.S. PATENT DOCUMENTS 3,567,619 3/1971 Brown ................................ 204/302
4,352,739 10/1982 Oliver ................................ 210/739
4,601,799 7/1986 Froberger et al. ............... 204/181.8
4,800,011 1/1989 Abbott et al. ....................... 204/302
4,961,845 10/1990 Dawson et al. ...................... 210/85

FOREIGN PATENT DOCUMENTS

47234/79 5/1979 European Pat. Off. ..... C10G 33/06

*Primary Examiner*—John Niebling
*Assistant Examiner*—William T. Leader
*Attorney, Agent, or Firm*—Fisher & Associates

[57] ABSTRACT

An electrostatic filter for non-conductive liquids including an electrically conductive cylindrical housing having a fluid inlet at a first end portion thereof and a fluid outlet at a second end portion thereof with an easily removable filter cartridge disposed in the housing between the fluid inlet and outlet. The filter cartridge is made up of concentric spaced electrically conductive tubes having filter members disposed in the space between the tubes with an opposite electric charge provided to each adjacent tube. The non-conductive fluid passes through the resulting electric charged field such that positive charged particulate migrate to a negative plate and negative charged particulate migrate to a positive plate with no discrimination as to the type or size of particulate.

3 Claims, 3 Drawing Sheets

ELECTROSTATIC FILTER FOR NON-CONDUCTIVE LIQUIDS

BACKGROUND OF THE INVENTION

1. Field of the Invention

The present invention relates generally to an electrostatic filter for non-conductive liquids; and more particularly to an electrostatic filter for removing particulate contaminants from turbine and hydraulic oils, synthetic fluids such as silicon oil, phosphate and silicate ester based oils, brake fluid, heat transfer fluids, transmission fluids and other natural and synthetic based fluids.

2. Description of the Prior Art

Conventional filter technology is based on the mechanical ability of a strainer or composition filtering material to remove contaminants that may vary in size from 1 micron to 100 micron and larger. While these filters can remove most of the particulate above 10 micron, their effectiveness on removing particulate of 10 micron size and below is hindered either by the filters design or the high pressure differential due to the accumulation of particulate in the filtering media. The filtration performance of this technology is limited by the pore size of the media. Only particles larger than the filter pore size will be removed, smaller than the pore size particulate collide with each other thus forming larger particulate and hence exasperating the pressure differential problem in the mechanical filter. In contrast, passing fluid through the electric charged field of the subject filter, where positive charged particulate migrate to the negative plate and negative charged particulate travel to the positive plate, there is no discrimination as to the type or size of particulate that can be removed. The prior art includes various designs of electrostatic filters that have evolved over the years. These filters still present a number of problems in terms of fabrication, testing, ease of replacement and safety of replacement. Additionally, some designs make no provision to remove colloidal contaminants chains, attendant arcing and subsequent unloading of the contaminant accumulation from the electrodes.

It has previously been proposed in the patent of Thompson U.S. Pat. No. 4,594,138 to provide a complex fabrication with nails placed through a plastic disposable cylinder housing to properly position electrodes at a respective distance to establish an inter-electrode space. Reproducing this design presents several readily apparent obstacles. U.S. Pat. No. 4,800,011 to Abbott-Durossette presents a complex, costly, disposable filter requiring blind insertion of plastic spacers of insufficient diameter to prevent distortion of the electrode during fabrication. Both of these designs flow fluid parallel to the line of force and transverse through the electrodes without sealing between the outside diameter of the electrode and the inside diameter of the plastic, disposable housing. This permits contaminated fluid to migrate through this open space, bypassing the route through the small holes provided in the electrode and hence diluting the performance of this design filter. Colloidal suspensions of particulate through these designs travel as a chain thus bridging the space between the electrodes and electrically grounding the system.

SUMMARY OF THE INVENTION

It is therefore an object of the present invention to provide an improved, simply installed electrode configuration, flowing fluid parallel to an electrode and transverse to the electrostatic force.

A further object of the present invention is to provide an improved, simply installed electrode configuration, flowing fluid parallel to an electrode and transverse to the electrostatic force, all enclosed within a reusable cartridge and housed in an all metal reusable container.

A still further object of this invention is to provide an improved electrostatic filter for removing particulate from a dielectric fluid at various rates of liquid flow.

It is a still further object of this invention to provide an improved electrostatic filter with a reusable cartridge.

It is a still further object of this invention to provide a cartridge that is easily and quickly assembled with a minimum of tools and alignment procedures.

It is a still further object of this invention to enable both the fabrication and the installation of an inter-electrode media into a cartridge as a simple noncomplicated assembly procedure; yet providing a precise dimension separation between the electrodes.

It is a still further object of this invention to arrange fluid flow through a filter cartridge in such fashion that particulate in the liquid is arranged or guided through the electrostatic field, thus being more disposed to accepting a polar charge.

BRIEF DESCRIPTION OF THE DRAWINGS

The invention will be further described in conjunction with the accompanying drawings, in which.

DETAILED DESCRIPTION OF PREFERRED EMBODIMENTS

Figure 1:
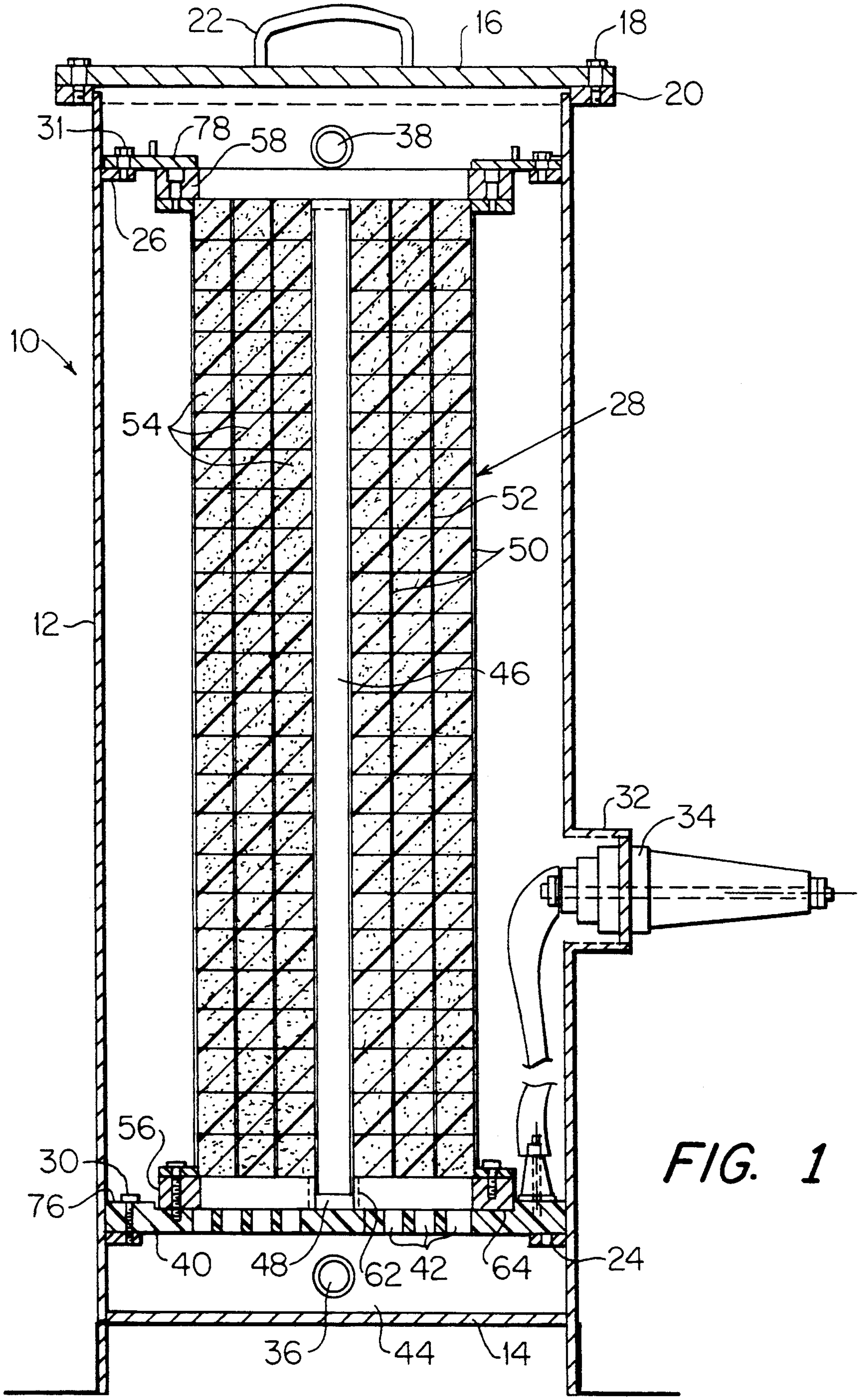
FIG. 1 is a longitudinal cross-sectional view of the electrostatic filter assembled in housing.

With reference to the figures, wherein like reference characters indicate like elements throughout the several views and in particularly to FIG. 1 wherein there is shown the electrostatic filter assembly 10 including a cylindrical housing 12 of electrically conductive metal such as aluminum and a circular base plate 14 of the same material. A circular top plate 16 is secured by means of threaded fasteners 18 to a housing flange 20 such that the self-contained electrostatic assembly 10 can be easily inserted and removed from a filtering system by means of a handle 22. A lower internal flange 24 and an upper internal flange 26 are fixed to the inner wall of the cylindrical housing 12 such that an orifice plate 40 is secured to flange 24 by means of threaded fasteners 30 and has a filter cartridge 28 sitting thereon a seal ring 78 holds the filter cartridge 28 within the housing by means for threaded fasteners 31. Cylindrical housing 12 further includes a tubular extension 32 having a hot line positive electrical connector 34 affixed thereto. Cylindrical housing 12 in the lower portion thereof includes a fluid inlet 36 and in the upper portion thereof a fluid outlet 38. An orifice plate 40 is attached to lower internal flange 24 by means of threaded fasteners 30. The orifice plate 40 is constructed of PVC or other non-conductive material and includes a circular array of apertures 42 for providing a fluid passage from a lower housing chamber 44 to the filter cartridge 28.

Figure 2:
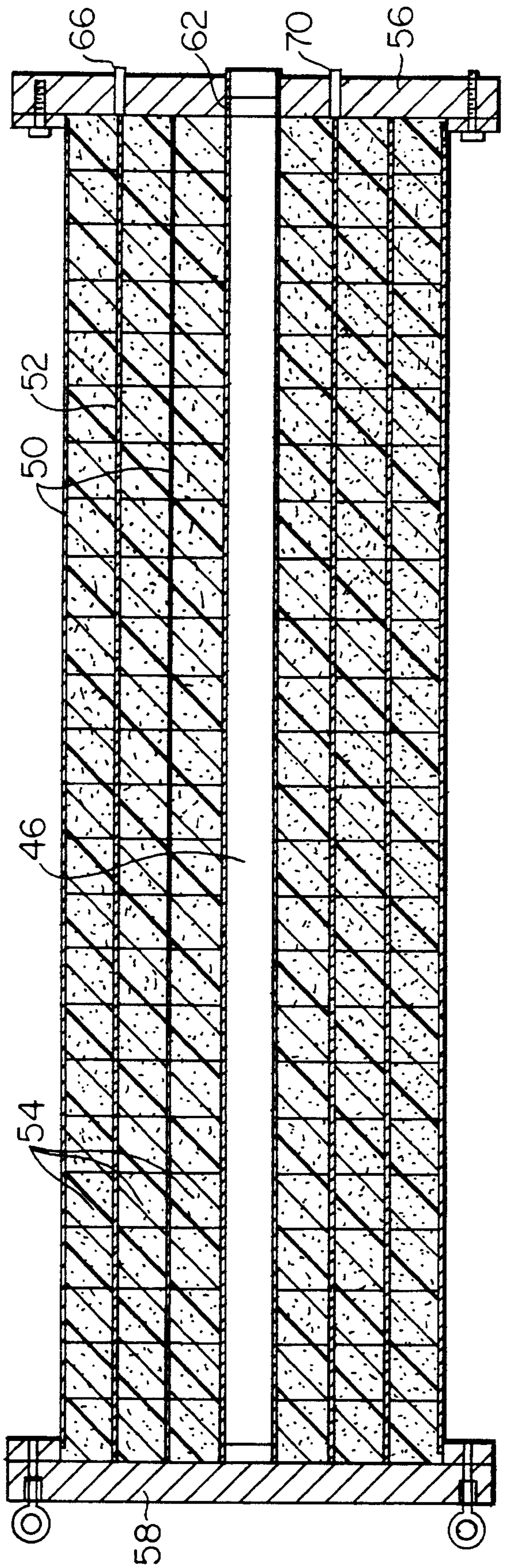
FIG. 2 is a partially broken away cross-sectional view of the electrostatic filter with electrical contact details.

As more clearly seen in FIGS. 1 and 2, the filter cartridge 28 is secured to the orifice plate 40 by means of a solid core adjustment tube 46 constructed of electrically conductive material. The solid core adjustment tube 46 is secured to the orifice plate 40 by means of threaded connection 48. Aluminum electrically conductive tubes 50 and 52 are concentrically arranged around solid core adjustment tube 46 and include disposed therebetween polyurethane open cell foam donut shaped filter members 54.

Figure 4:
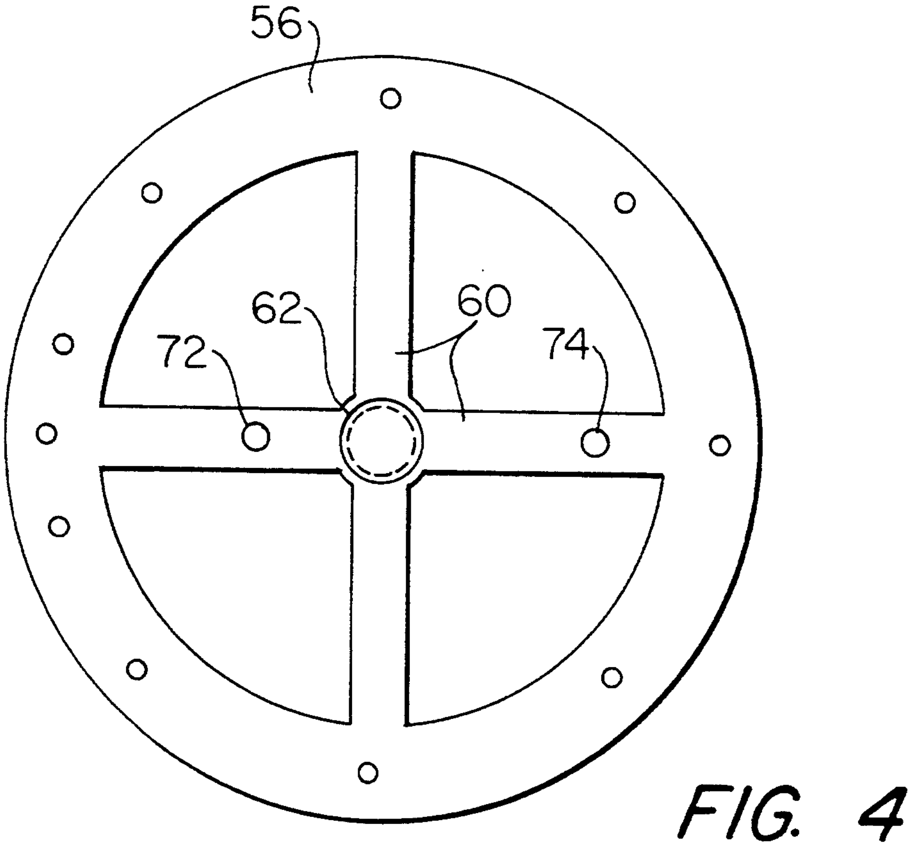
FIG. 4 is a plan view of the cartridge base plate.

As seen in FIGS. 1, 2, and 4, a lower cartridge base plate 56 and an upper cartridge base plate 58 are secured to the ends of the filter cartridge 28 by means of electrically conductive fasteners and include web members 60. The lower cartridge base plate 56 includes a threaded aperture 62 for receiving the solid core adjustment tube 46.

The fluid material to be treated enters the electrostatic filter assembly through fluid inlet 36, and at first fills the lower housing chamber 44. The fluid flows through apertures 42 and proceeds upwardly through the polyurethane open cell foam donut shaped filter members 54 such that the filtered fluid exits the electrostatic filter assembly through fluid outlet 38.

Figure 3:
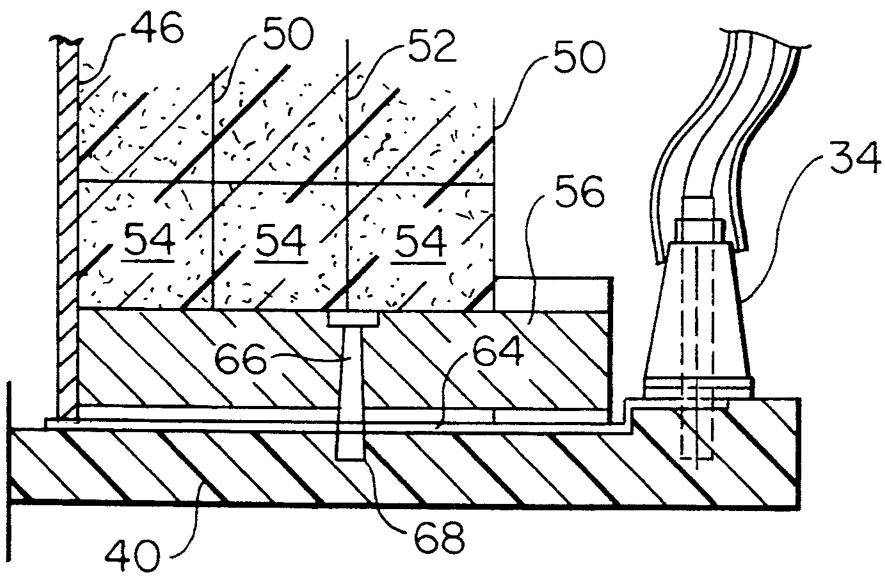
FIG. 3 is a partial cross-sectional view of the high voltage input to the electrostatic filter.

The electrical connection of the aluminum tubes 50 and 52 is described in detail with reference to FIGS. 1, 2 and 3 as follows. The housing 12 is connected to ground thus creating the negative side of the electrical connection of the electrostatic filter assembly. The hotline positive electrical connector 34 is connected to an electrically conductive strip 64 attached to the upper surface of the orifice plate 40. An electrically conductive rivet 66 is in direct contact with the base of aluminum tube 52 and is pressed into a detent 68 to assure a positive electrical connection between aluminum tube 52, electrically conductive strip 64 and the hotline positive electrical connector 34. Furthermore, the solid core adjustment tube 46 is in engagement with electrically conductive strip 64. Therefore, the positive side of the electrical connection provided by electrical connector 34 is inter-connected with aluminum tube 52 and the solid core adjustment tube 46. An aperture 74 in web member 60 is provided for receiving rivet 66 and an aperture 72 is provided in web member 60 for receiving rivet member 70. A conductive strip 76 interconnects tubes 50 with cylindrical housing 12. Therefore, core adjustment tube 46 and aluminum tube 52 are connected to positive while tubes 50 are connected to negative.

In operation, as the fluid to be treated passes through the polyurethane open cell foam donut shaped filter members 54, the particulate material contained therein is given either a positive or negative charge depending upon the proximity of the particle to the solid core adjustment tube and the aluminum tubes 50 and 52. Oppositely charged particles will then attach to each other to form larger particles which will form groupings of particles. As the groupings of particles become larger and larger they will become trapped in the polyurethane open cell foam donut shaped filter members 54.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An electrostatic filter for non-conducting liquids comprising:

a cylindrical housing having an axial direction and composed of electrically conductive material having a fluid inlet at a first end portion thereof and a fluid outlet at a second end portion thereof;

an orifice plate having a plurality of apertures therein and located at the inlet end of said housing;

an easily removable filter cartridge disposed in said cylindrical housing and positioned on said orifice plate, said filter cartridge extending in the same axial direction as said cylindrical housing between said orifice plate and said outlet, said filter cartridge including a plurality of concentric spaced electrically conductive tubes adapted to function as electrodes and extending in the same axial direction as said cylindrical housing, said orifice plate being adapted to direct flow in the axial direction between the spaced tubes;

filter means disposed in the space between said concentric conductive tubes;

means for directing the fluid flow exclusively parallel to the electrodes and transverse to the electrostatic field present between said electrodes during operation of the filter such that positive charged particulate migrate to a negative electrode and negative charged particulate migrate to a positive electrode with no discrimination as to the type or size of particulate;

a hot line positive electrical connector; and electrically conductive members disposed on said orifice plate for electrically connecting said cylindrical housing and said positive electrical connector to said concentric spaced electrically conductive tubes in such as manner as to provide an opposite electric charge to each adjacent concentric tube.

2. An electrostatic filter for non-conductive liquids according to claim 1 wherein said filter members are a plurality of stacked donut shaped rings.

3. An electrostatic filter for non-conductive liquids according to claim 2 wherein said stacked donut shaped rings are made of polyurethane open cell foam.

* * * * *